US011884593B2

(12) United States Patent
Perrino et al.

(10) Patent No.: US 11,884,593 B2
(45) Date of Patent: Jan. 30, 2024

(54) LEVELING AND NOISE REDUCING MORTAR COMPOSITION

(71) Applicant: SIKA TECHNOLOGY AG, Baar (CH)

(72) Inventors: Luigi Perrino, Nago Torbole (IT); Tiziano Rattighieri, Modena (IT); Alberto Borghi, Campogalliano (IT); Corrado Scollo, Modena (IT); Daniela Hesselbarth, Zürich (CH); Luz Granizo, Madrid (ES)

(73) Assignee: SIKA TECHNOLOGY AG, Baar (CH)

( * ) Notice: Subject to any disclaimer, the term of this patent is extended or adjusted under 35 U.S.C. 154(b) by 184 days.

(21) Appl. No.: 17/440,894

(22) PCT Filed: Mar. 23, 2020

(86) PCT No.: PCT/EP2020/058013
§ 371 (c)(1),
(2) Date: Sep. 20, 2021

(87) PCT Pub. No.: WO2020/200890
PCT Pub. Date: Oct. 8, 2020

(65) Prior Publication Data
US 2022/0162125 A1 May 26, 2022

(30) Foreign Application Priority Data

Mar. 29, 2019 (EP) .................... 19166282

(51) Int. Cl.
| | |
|---|---|
| *C04B 28/06* | (2006.01) |
| *B32B 3/14* | (2006.01) |
| *B32B 7/12* | (2006.01) |
| *B32B 9/00* | (2006.01) |
| *B32B 13/04* | (2006.01) |
| *C04B 14/24* | (2006.01) |
| *C04B 16/12* | (2006.01) |
| *C04B 18/02* | (2006.01) |
| *C04B 28/08* | (2006.01) |
| *C04B 111/00* | (2006.01) |
| *C04B 111/52* | (2006.01) |

(52) U.S. Cl.
CPC .............. *C04B 28/065* (2013.01); *B32B 3/14* (2013.01); *B32B 7/12* (2013.01); *B32B 9/005* (2013.01); *B32B 13/04* (2013.01); *C04B 14/24* (2013.01); *C04B 16/12* (2013.01); *C04B 18/027* (2013.01); *C04B 28/08* (2013.01); *B32B 2307/102* (2013.01); *B32B 2419/04* (2013.01); *C04B 2111/00637* (2013.01); *C04B 2111/52* (2013.01)

(58) Field of Classification Search
CPC ....... C04B 28/065; C04B 14/24; C04B 16/12; C04B 18/027; C04B 28/02; C04B 28/06; C04B 28/08; C04B 2111/00637; C04B 2111/52; C04B 2111/00672; C04B 2111/60; C04B 2111/62
See application file for complete search history.

(56) References Cited

U.S. PATENT DOCUMENTS 9,670,095 B2 * 6/2017 Al-Aqeeli ............. C04B 26/006

FOREIGN PATENT DOCUMENTS

| CN | 102249614 A | | 11/2011 | |
|---|---|---|---|---|
| CN | 103739220 A | * | 4/2014 | |
| CN | 104487400 A | | 4/2015 | |
| CN | 105753419 A | | 7/2016 | |
| CN | 106348671 A | | 1/2017 | |
| CN | 108503316 A | | 9/2018 | |
| EP | 1531209 A1 | * | 5/2005 | ............. C04B 24/26 |
| EP | 1531209 A1 | | 5/2005 | |
| EP | 1686103 A2 | | 8/2006 | |
| EP | 1721876 A1 | | 11/2006 | |
| EP | 3348535 A1 | | 7/2018 | |
| NL | 2014985 A | | 3/2016 | |
| WO | 2011/15508 A1 | | 2/2011 | |
| WO | 2015/179738 A1 | | 11/2015 | |

OTHER PUBLICATIONS

[NPL-1] Fruendt et al. (EP 1531209 A1), May 2005 (EPO machine translation to English). (Year: 2005).*
Hu et al., "Study on Acoustic Absorption of Rubber Modification Cement Mortar;" pp. 1-10, 2011.
Jun. 23, 2020 International Search Report issued in International Patent Application No. PCT/EP2020/058013.
C. Wang; "Elastic cement-based self-leveling mortar and prepartion method thereof"; Thomson Scientific, London, GB; AN 2017-10654N; Database WPI, Week 201720; Jan. 25, 2017; XP002794677.
Y. Liu et al.; "Light thermal insulation soundproof damping floor mortar"; Thomson Scientific, London, GB; AN 2011- Q35554; Database WPI Week 201204; Nov. 23, 2011; XP002794676.

* cited by examiner

*Primary Examiner* — Anthony J Green
(74) *Attorney, Agent, or Firm* — Oliff PLC

(57) ABSTRACT

A mortar composition, in particular a leveling mortar composition, including: a) 3-45 wt. % of a hydraulic binder, b) 15-80 wt. % of lightweight aggregates, c) 5-50 wt. % of a polymer.

13 Claims, No Drawings

LEVELING AND NOISE REDUCING MORTAR COMPOSITION

TECHNICAL FIELD

The invention relates to a mortar composition, in particular a leveling mortar composition as well as to a kit-of-parts comprising a mortar composition and an adhesive composition. A further object of the invention is a structure, in particular a floor, a wall or a ceiling, comprising a substrate, a first layer, a second layer and a cover element, which is in particular a tile. In addition, the invention relates to the use of the mortar composition or the kit-of-parts for fixing tiles on a substrate, acoustic damping, noise reduction and/or vibration reduction.

BACKGROUND ART

Substrates, e.g. floor substrates, made of raw concrete usually are rough and uneven. This makes it difficult to fix coverings such as e.g. tiles, carpet, plastic flooring, veneer, etc. in a satisfying manner. Therefore, it is important to prepare even and smooth substrate surfaces prior to fixing or laying of coverings.

With regard to floor substrates, this can be achieved by applying leveling mortars onto the raw floor substrate in order to obtain an even and smooth underlayment. Leveling mortars can have high flow characteristics and a rather thin consistency such that once the product is mixed with water, it can simply be poured over the floor's uneven substrate and thereby even-out the surface. Likewise, they can have a higher consistency and be troweled afterapplication.

EP 1 721 876 A1 (Sika) describes for example a process for the preparation of a leveling mortar. Thereby, a solid component that comprises an alkali-activated cementing material containing 10-20% of silica and alumina, 1-10% of a calcium alum inate cement or a white cement and fine aggregate is mixed together, with agitation, with a liquid component that comprises a 30-50% solution of sodium hydroxide, as well as sodium silicate, where the $SiO_2$ content is less than 30% and the $Na_2O$ content is less than 20%, the ratio between the liquid and the solid component being in the range 0.10-0.30 by weight.

In addition, from decorative tiled surfaces to highly functional tiled wall and floor finishes, tiling is one of the most popular surface finishing techniques that are used to enhance the appearance and functionality of all types of buildings and facilities.

A tiled structure typically comprises (i) a substrate, e.g. a supporting structure, (ii) optionally an underlayment, e.g. a leveling mortar, (iii) an adhesive, (iv) tiles, e.g. in the form of ceramic tiles, stones and/or veneers, as well as (v) grouted joints and movement joints between the tiles. Thereby, tiles are fixed to the substrate or the underlayment with the adhesive. Depending on their composition, according to standard EN 12004:2017, tile adhesives are grouped into 3 main types: cementitious adhesives (C), dispersion adhesives (D) and reaction resin adhesives (R). Cementitious adhesives typically contain inter alia hydraulic cement, sand and fillers.

WO 2015/179738 A1 (Laticrete International, Inc.) describes for example ready to use grout and/or adhesive formulations that are suitable for use as a ceramic tile adhesive or as a tile grout, filling spaces between ceramic tiles. The formulations are based on a premixed cementitious slurry and an activation constituent for destabilizing the slurry by increasing its pH.

Furthermore, in buildings or facilities, the transmission of undesired sound or vibrations trough structural elements, floors, walls or ceilings is a challenging problem. Therefore, surfaces, especially tiled surfaces, are not only expected to be visually appealing and functional, but also to contribute to noise or vibration suppression. This is in particular true for floorings since foot noise is a major source of noise in buildings.

Although there are mortar composition that are highly beneficial in terms of smoothing and leveling of surfaces, they do not sufficiently contribute to noise or vibration suppression or they have other drawbacks.

There is thus a need to provide improved solutions, which overcome the aforementioned drawbacks.

DISCLOSURE OF THE INVENTION

It is an object of the present invention to provide an advantageous mortar composition, which is in particular beneficial for use as underlayment or topping, especially as underlayment in tiled structures. Especially, the mortar composition should be useful as leveling mortar composition for floorings. Preferably, the mortar composition should be easy to process and have good flow characteristics. At the same time, the mortar composition should contribute to noise or vibration reduction, especially in tiled structures.

Surprisingly, it has been found that the object can be achieved by the features of claim 1. Thus, the core of the invention is a mortar composition, in particular a leveling mortar composition, comprising or consisting of:

a) 3-45 wt. % of a hydraulic binder,
b) 15-80 wt. % of lightweight aggregates,
c) 5-50 wt. % of a polymer.

Preparing the mortar composition is quite easy and safe: The mortar composition, in particular in dry state, is mixed with an appropriate amount of water. After this, the mortar composition is ready for application. Furthermore, the mortar composition itself can be a one-component mixture. This excludes the risk of a mix-up or wrong dosing of individual components by users.

After mixing with water, the inventive mortar compositions are easy to process. Thereby, a rather long pot life of around 30 minutes can be achieved. Especially, mixed compositions can have a consistency which allows for leveling on horizontal surfaces. For example, even and smooth surfaces can be produced on rough and uneven floor substrates made of raw concrete.

As could be shown, the mortar compositions additionally feature good adhesion to different kind of materials, in particular concrete, mortar and adhesives, especially tile adhesives.

Thus, the mortar compositions are highly useful as underlayment for coverings such as e.g. tiles, carpet, plastic flooring, veneers, etc. Nevertheless, the mortar compositions are suitable as toppings as well, e.g. as warehouse floors. A topping acts as the actual finished surface, in particular a floor, without further covering.

At the same time, the mortar compositions help to suppress noise and/or vibrations, especially in tiled structures. For example, foot traffic noise on floorings can be reduced significantly. Specifically, impact noise reductions from 6-20 dB could be observed (according to ISO 10140-3:2010 and ISO 717-2).

Additional aspects of the invention are subject of further independent claims. Particularly preferred embodiments are outlined throughout the description and the dependent claims.

WAYS OF CARRYING OUT THE INVENTION

A first aspect of the present invention is directed to a mortar composition, in particular a leveling mortar composition, comprising or consisting of:
a) 3-45 wt. % of a hydraulic binder,
b) 15-80 wt. % of lightweight aggregates,
c) 5-50 wt. % of a polymer.

In particular, all amounts are with respect to the total weight of the mortar composition in dry state.

In the present context, the expression "hydraulic binder" in particular stands for substances that harden because of chemical reactions with water producing hydrates. Preferably, the hydrates produced are not water-soluble. In particular, the hydration chemical reactions of the hydraulic binder takes essentially place independently of the water content. This means that the hydraulic binder can harden and retain its strength even when exposed to water, e.g. underwater or under high humid conditions.

The term "lightweight aggregates" stands in particular for aggregates with a particle density ≤2,000 kg/m³, preferably ≤1,500 kg/m³, especially ≤1,250 kg/m³. The particle density of an aggregate is the ratio between the mass of the particle material and the volume occupied by the individual particles. This volume includes the pores within the particle, but does not include voids between the particles. Especially, the particles of the aggregates can have any spherical and/or non-spherical geometric shape, either uniform or non-uniform. For example, the particles can be spherical-, conical-, polygonal-, cubic-, pentagon-, hexagon-, octagon-, prismatic and/or polyhedral-shaped. Non-uniform particles can have for example circular, elliptical, oval, square, rectangular, triangular or polygonal cross sections found at least partially therein. "Non-uniform" and "irregular" shaped particles refer to three-dimensional particle shapes wherein at least two different cross sections taken through said particles have different shapes.

Especially, the mortar composition is a dry mortar composition. This means that the mortar composition is essentially free of water or an amount of water is below 1 wt. %, in particular below 0.5 wt. % or below 0.1 wt. %, with respect to the total weight of the mortar composition.

According to a preferred embodiment, the mortar composition is a one-component mixture. That means that all the individual materials and/or substances are intermixed. One-component compositions are in particular easy to handle and exclude the risk of a mix up or wrong dosing of individual components by users.

However, it is in principle possible to provide a two-component mortar composition or even a multi-component mortar composition. A first component may e.g. be present in a first receptacle comprising the hydraulic binder and the polymer. A second component, present in a second receptacle, may comprise the aggregates. Other distributions are possible as well. Two- or multi-component mortar compositions allow e.g. for adjusting the mortar composition with regard to specific applications.

A preferred amount of hydraulic binder is 3-35 wt. %, in particular 4-20 wt. %, especially 5-15 wt. %, with respect to the total weight of the mortar composition in dry state.

Preferably, the hydraulic binder comprises or consists of Portland cement, alum inate cement, sulphoaluminate cement, latent hydraulic and/or pozzolanic binder materials, calcium sulfate hemihydrate, anhydrite and/or hydrated lime.

Preferred Portland cement is according to norm EN 197, in particular of type CEM I. The term "alumina cement" stands in particular for a cement with an aluminum content, measured as $Al_2O_3$, of at least 30 wt. %, especially at least 35 wt. %, in particular 35-58 wt. %. Preferably, the alumina cement is alumina cement according to standard EN 14647. Preferably, the sulphoaluminate cement is calcium sulphoaluminate cement.

The term "latent hydraulic and/or pozzolanic binder materials" stands in particular for type II concrete additives with latent hydraulic and/or pozzolanic character according to EN 206-1. In particular, the latent hydraulic or pozzolanic binder material comprises or consists of slag, fly ash, silica fume, metakaolin and/or natural pozzolanes. Thereby, slag and/or fly ash, in particular furnace slag is especially preferred.

Calcium sulfate hemihydrate or $CaSO_4 \cdot 0.5\ H_2O$ may be present as α-hemi-hydrate or β-hemi-hydrate. Anhydrite is in particular anhydrite II and/or anhydrite III, whereas hydrated lime stands for calcium hydroxide.

Especially preferred, the hydraulic binder comprises alum inate cement and/or sulphoaluminate cement, preferably with a proportion of 3-18 wt. %, in particular 4-15 wt. %, especially 5-10 wt. %, with respect to the total weight of the mortar composition in dry state.

In particular, the hydraulic binder comprises Portland cement, preferably with a proportion of 3-18 wt. %, in particular 4-15 wt. %, especially 5-10 wt. %, with respect to the total weight of the mortar composition in dry state.

Especially, the hydraulic binder comprises Portland cement as well as aluminate cement and/or sulphoaluminate cement with a weight ratio of Portland cement to aluminate cement and/or sulphoaluminate cement from 0.2-4, especially 0.5-3, in particular 0.7-1.5.

In particular, the hydraulic binder comprises latent hydraulic and/or pozzolanic binder materials, especially slag and/or fly ash, preferably with a proportion of 3-18 wt. %, in particular 4-15 wt. %, especially 5-10 wt. %, with respect to the total weight of the mortar composition in dry state.

In particular, the hydraulic binder comprises aluminate cement and/or sulphoaluminate cement as well as latent hydraulic and/or pozzolanic binder materials with a weight ratio of aluminate cement and/or sulphoaluminate cement to the latent hydraulic and/or pozzolanic binder materials from 0.5-3, especially 0.7-2.5, in particular 1-2.

Preferably, the mortar composition comprises:
3-18 wt. %, in particular 4-15 wt. %, especially 5-10 wt. %, aluminate cement and/or sulphoaluminate cement;
optionally 3-18 wt. %, in particular 4-15 wt. %, especially 5-10 wt. %, Portland cement;
optionally 3-18 wt. %, in particular 4-15 wt. %, especially 5-10 wt. % latent hydraulic and/or pozzolanic binder materials, especially slag and/or fly ash;
optionally 1-8 wt. %, in particular 2-6 wt. %, especially 2-4 wt. %, calcium sulfate hem ihydrate and/or anhydrite;
optionally 0.1-5 wt. %, in particular 0.2-3 wt. %, especially 0.5-1.5 wt. %, hydrated lime;
whereby all amounts are with respect to the total weight of the mortar composition in dry state.

With regard to the lightweight aggregates, a particle density of the lightweight aggregates is preferably from 100-2,000 kg/m³, especially 400-1,900 kg/m³, preferably 700-1,500 kg/m³ or 800-1,300 kg/m³.

Especially, a proportion of the lightweight aggregates is from 30-80 wt. %, in particular 50-75 wt. %, especially 55-70 wt. %, with respect to the total weight of the mortar composition in dry state.

Preferred lightweight aggregates comprise or consist of wood particles, rubber particles, layered particles, plastic particles and/or porous particles, especially porous inorganic particles. More preferred particles are rubber particles and/or porous particles. Most preferred particles are rubber particles.

Even more preferred, the lightweight aggregates comprise or consist of rubber particles, layered particles and/or porous particles. Most preferred, the lightweight aggregates comprise or consist of rubber particles, optionally in combination with porous particles.

In particular, a particle size of the lightweight aggregates is from 0.01-4 mm, especially 0.05-3 mm, preferably 0.1-2 mm, in particular 0.1-1.5 mm.

The particle size can e.g. be determined by laser diffraction as described in ISO 13320:2009. Preferably, a particle size of non-spherical or irregular particles is represented by the equivalent spherical diameter of a sphere of equivalent volume. Especially, the lower values of the ranges given for the particle size represent D1 values whereas the upper values of the ranges given for the particle size represent D99 values. Put differently, in this case, 1% of the particles have a lower particle size than the lower value of a range, whereas 1% of the particles have a larger particle size than the upper value of a range.

Especially, the lightweight aggregates include two different types of particles, especially with two different particles sizes. Preferably, a first type of particles have a particle size of 0.01-0.5 mm, especially 0.1-0.4 mm, and a second type of particles have a particle size of 0.6-2 mm, especially 0.6-1.5 mm. whereby, preferably, both types of particles are rubber particles.

In particular, a weight ratio of the first type of particles having a smaller particle size to the second type of particles having a larger particle size is from 1:2-8:1, in particular 1:1-5:1, especially 2:1-4:1 or 2.5:1-3.5:1.

Preferably, the particles have a none-spherical and/or irregular shape, especially a prismatic shape.

In the present context, the term "rubber" stands in particular for an elastomer, especially a thermoset. Rubber particles can consist of natural and/or synthetic rubber. The rubber is chemically different from the above-mentioned polymer.

In particular, the rubber particles comprise or consist of natural polyisoprene; synthetic polyisoprene; polybutadiene; chloroprene rubber, such as e.g. polychloroprene, neoprene, baypren; butyl rubber, in particular copolymers of isobutylene and isoprene; halogenated butyl rubber, such as e.g. chloro butyl rubber, bromo butyl rubber; styrene-butadiene rubber, in particular copolymers of styrene and butadiene, nitrile rubber, in particular a copolymer of butadiene and acrylonitrile and/or hydrogenated nitrile rubber.

For example, the rubber particles are recycled rubber particles, in particular obtained from worn shoes and/or tires.

For example, the rubber particles are derived from rubber products, e.g. end-of-life tires, through cryogenic milling.

Especially, the lightweight aggregates in include two different types of rubber particles, especially with two different particles sizes. Preferably, a first type of the rubber particles have a particle size of 0.01-0.5 mm, especially 0.1-0.4 mm, and a second type of the rubber particles have a particle size of 0.6-2 mm, especially 0.6-1.5 mm.

In particular, a weight ratio of the first type of rubber particles having a smaller particle size to the second type of rubber particles having a larger particle size is from 1:2-8:1, in particular 1:1-5:1, especially 2:1-4:1 or 2.5:1-3.5:1.

Preferably, the rubber have a none-spherical or irregular shape.

In a further preferred embodiment, the lightweight aggregates comprise or consist of porous particles. In particular, the porous particles have a porosity of at least 25 vol. %, especially at least 50 vol. %, in particular at least 75 vol. %, with respect to the total volume of the porous particles.

Especially, the porous particles are chosen from expanded polystyrene granules, expanded silica, volcanic rock, e.g. pumice and/or perlite. Expanded silica is highly preferred.

However, the lightweight aggregates may also comprise or consist of layered materials, cork and/or plastics, in particular recycled plastics. For example, the lightweight aggregates comprise or consist of polyethylene terephthalate (PET), mica and/or vermiculite.

In particular, the composition comprises 30-80 wt. %, especially 50-75 wt. %, of rubber particles and optionally 1-15 wt. %, especially 2-10 wt. %, of porous particles, preferably expanded glass, as lightweight aggregates.

Most preferred, the lightweight aggregates comprise or consist of:
- 30-80 wt. %, especially 50-75 wt. %, of rubber particles, whereby the rubber particles comprise a first type of the rubber particles having a particle size of 0.01-0.5 mm, especially 0.1-0.4 mm, and a second type of the rubber particles having a particle size of 0.6-2 mm, especially 0.6-1.5 mm; and
- wherein a weight ratio of the first type of rubber particles having a smaller particle size to the second type of rubber particles having a larger particle is from 1:2-8:1, in particular 1:1-5:1, especially 2:1-4:1 or 2.5:1-3.5:1; and
- wherein the rubber have a none-spherical or irregular shape; and
- optionally, 1-15 wt. %, especially 2-10 wt. %, of porous particles, especially with a particle size of the porous particles is 0.1-0.6 mm, whereby, preferably, the porous particles comprise or consist of expanded glass, wherein all of the proportions are with respect to the total weight of the mortar composition in dry state.

According to a further embodiment, the mortar composition additionally comprises 0-10 wt. %, in particular 0.5-10 wt. %, especially 1-7 wt. %, with respect to the dry weight of the mortar composition, of further aggregates which have a particle density that is higher than the particle density of the lightweight aggregates. In particular, the further aggregates have a particle density $>2,000$ kg/m$^3$, especially $>2,100$ kg/m$^3$ or $>2,200$ kg/m$^3$.

A particle size of the further aggregates preferably is in the range of 0.05-1 mm, especially 0.1-0.3 mm.

In particular, the further aggregates comprise sand, quartz, calcium carbonate, natural river sand, gravel, basalt and/or metallic aggregates, especially sand and/or calcium carbonate.

However, it is also possible to provide a mortar composition in which the further aggregates have a proportion $<5$ wt. %, especially $<1$ wt. %, with respect to the dry weight of the mortar composition. In particular, it is possible to provide a mortar composition which does not comprise any further aggregates and/or any aggregates with a particle density $>2,000$ kg/m$^3$, especially $>2,100$ kg/m$^3$ or $>2,200$ kg/m$^3$.

Preferably, the polymer used in the mortar composition is a water-soluble or water-redispersible polymer, in particular a redispersible polymer. Such polymers have proven to be beneficial in the present mortar compositions. However, e.g. for specific purposes, other polymers might be suitable as well.

Preferably, the polymer is present in solid state, especially as a powder.

Especially, the polymer is used as a binder in order to control strength of the mortar composition.

Preferably, the polymer has a glass transition temperature of −45-10° C., especially −35-5° C., preferably −25-0° C., in particular −20-0° C., particularly preferred −20-−10° C. Such polymers can further improve the strength and noise suppression properties of the mortar composition. Most preferred are redispersible polymers with these glass transition temperatures.

The glass transition temperature is determined by Differential Scanning Calorimetry according to standard ASTM E1356-08(2014).

Especially, the polymer is a homopolymer or copolymer based on one or more monomers selected from a vinyl ester, vinyl acetate, vinyl alcohol, vinyl chloride, vinyl laureate, acrylic acid, acrylate, methacrylic acid, methacrylate, methylmethacrylate, acrylonitrile, styrene, butadiene, ethylene or mixtures thereof.

Highly preferred are copolymers based on vinyl acetate and ethylene.

Preferably, the polymer is selected from poly(vinyl acetate-ethylen), poly(vinyl acetate-ethylen-methylmethacrylate), poly(vinyl acetate-ethylen-vinylester), poly(vinyl acetate-ethylen-acrylic acid ester), poyl(vinyl acetate-ethylen-vinyl laureate), poly(vinyl acetate-vinyl versate), poly(acrylic ester-acrylonitrile), poly(acrylic ester-styrene butadiene) or mixtures thereof. Highly preferred as the polymer is a poly(vinyl acetate-ethylene).

However, other polymers might be suitable as well.

A preferred amount of the polymer is 3-30 wt. %, in particular 5-20 wt. %, especially 7-15 wt. %, with respect to the total weight of the mortar composition.

Preferably, a weight ratio of the polymer to the hydraulic binder in the mortar composition is from 0.1-17, in particular, 0.2-7, especially, 0.3-5, particularly 0.4-2 or 0.7-1.5. Preferably, a weight ratio of the lightweight aggregates to the polymer is from 1-20, in particular 2-15, especially 3-10. This is in particular true if the lightweight aggregates comprise or consist of rubber and the polymer is a redispersible polymer.

Furthermore, it can be beneficial if the mortar composition comprises at least one additive selected from the group consisting of setting time regulators, plasticizers, defoamers, rheology modifiers, thixotropic agents, aerating and/or foaming agents, anti-shrinkage agents, corrosion inhibitors, fire-retarding agents, fibers, and chromium reducers.

Preferably, a proportion of the additives in total is from 0-10 wt. %, especially 1-10 wt. % with respect to the weight of the mortar composition in dry state.

Preferably, the mortar composition comprises a layered silicate, in particular a phyllosilicate, as an additive. Preferably, the layered silicate is a bentonite or an aluminum phyllosilicate. Especially, a layered silicate is used in combination with rubber particles as described above. As it turned out, layered silicates help to stabilize rubber particles in the mortar composition.

A proportion of the layered silicate is preferably from 0.01-10 wt. %, in particular 0.1-7 wt. %, especially 0.2-3 wt. %, with respect to the weight of the mortar composition in dry state.

Especially the mortar composition comprises a thixotropic agent, in particular silica, silica fume, cellulose, and/or saccharides. A proportion of the thixotropic agent is preferably from 0.001-1 wt. %, in particular 0.1-0.5 wt. %, with respect to the weight of the mortar composition in dry state.

According to another preferred embodiment, the mortar composition comprises a plasticizer, whereby the plasticizer is in particular selected from the group of lignosulfonates, gluconates, naphtalenesulfonates, melamine sulfonates, vinyl copolymers and/or polycarboxylate ethers. Polycarboxylate ethers are preferred. In particular, the plasticizer is chemically different from the above-mentioned polymer and rubber. A proportion of polycarboxylate ethers is preferably from 0.001-1 wt. %, in particular 0.1-0.5 wt. %, with respect to the weight of the mortar composition in dry state.

Preferably, the mortar composition comprises fibers, in particular glass, plastic and/or cellulose fibers. Glass fibers are highly preferred. A proportion of the fibers is preferably from 0.001-3 wt. %, in particular 0.01-2.0 wt. %, especially 0.1-1 wt. %, with respect to the weight of the mortar composition in dry state. A preferred length of the fibers is from 0.5-12 mm, especially 2-5 mm. A diameter of the fibers is for example 0.5-1,000 μm, especially 1-100 μm, in particular 5-40 μm.

A preferred mortar composition comprises or consists of:
- 3-18 wt. %, in particular 4-15 wt. %, especially 5-10 wt. %, aluminate cement and/or sulphoaluminate cement;
- optionally 3-18 wt. %, in particular 4-15 wt. %, especially 5-10 wt. %, Portland cement;
- optionally 4-8 wt. % latent hydraulic and/or pozzolanic binder materials, especially slag and/or fly ash;
- 30-80 wt. %, especially 50-75 wt. %, of rubber particles, especially comprising two different types of rubber particles with two different particles sizes wherein, in particular, a weight ratio of the first type of particles having a smaller particle size to the second type of particles having a larger particle is from 2:1-4:1 or 2.5:1-3.5:1;
- 1-15 wt. %, of porous particles, especially with a particle size of the porous particles is 0.1-0.6 mm, whereby, preferably, the porous particles comprise or consist of expanded glass 1-15 wt. % of porous inorganic particles, especially with a particle size of 0.1-0.6 mm;
- 5-20 wt. %, especially 7-15 wt. %, of a water soluble or water redispersible polymer, especially a copolymer based vinyl acetate and ethylene;
- 0-10, especially 1-5 wt. %, of one or more additives, especially comprising layered silicates;

whereby the proportions are with respect to the weight of the mortar composition in dry state.

A highly preferred mortar composition comprises or consists of:
- 4-15 wt. % of calcium aluminate cement;
- 4-15 wt. % of Portland cement;
- optionally 4-8 wt. % latent hydraulic and/or pozzolanic binder materials, especially slag and/or fly ash;
- 50-75 wt. %, of rubber particles, comprising two different types of rubber particles with two different particles sizes wherein a weight ratio of the first type of particles having a smaller particle size to the second type of particles having a larger particle is from 2:1-4:1 or 2.5:1-3.5:1;
- 2-20 wt. % of porous inorganic particles with a particle size of 0.1-0.6 mm, whereby, preferably, the porous particles comprise or consist of expanded glass;
- 7-15 wt. %, of a water soluble or water redispersible polymer, especially a copolymer based vinyl acetate and ethylene;

1-10 wt. %, of one or more additives, especially comprising layered silicates;

wherein, preferably, a proportion of aggregates with a particle density >2,000 kg/m$^3$ is <5 wt. % or <1 wt. %;

whereby the proportions are with respect to the weight of the mortar composition in dry state.

Without being bound by theory, it is believed that in comparison with compositions comprising rather low proportions of polymers, e.g. below 3 wt. %, inventive compositions with a higher polymer content of at least 3 wt. %, in particular at least 5 wt. %, can be formulated with less hydraulic binder, e.g. cement, and still having improved properties. For example, the inventive compositions feature greater flexibility and better sound dampening without significantly affecting other mechanical properties. If lower amounts of polymers are used, the hydraulic binder content needs to be increased in order to achieve similar mechanical properties. This in turn, however, leads to poorer sound dampening. If too much polymer is used, there is a strong retardation. However, the retarding effects of higher proportions of polymers might be compensated with aluminum cements. Thus, the inventive proportions of the polymer with the inventive ratio of the polymer to the hydraulic binder, optionally in combination with alum inate cement and/or sulphoaluminate cement, is highly beneficial.

Another aspect of the present invention relates to a method for producing a processable mortar composition, comprising the step of adding water to a mortar composition as described above.

Thereby, preferably, a weight ratio of water to the mortar composition in dry state is from 0.30-0.70, in particular 0.32-0.50, especially 0.34-0.44.

A further aspect of the present invention is a hardened mortar composition obtainable by adding water to a mortar composition as described above or obtainable by the method as described above. Preferably, the mortar composition is placed on a substrate, in particular on a floor, especially made of concrete.

Preferably, the hardened mortar composition is present in the form of a layer, a coating and/or a sheet, especially placed on a substrate. Preferably, a thickness of the hardened mortar composition is from 4-10 mm, especially 5-9 mm.

Another aspect of the present invention relates to a kit of parts comprising or consisting of (i) a mortar composition as described above, in particular in dry state and (ii) an adhesive composition, especially a tile adhesive, in particular in dry state, whereby the adhesive composition comprises or consists of:

a) 10-50 wt. % of a hydraulic binder,
b) 20-60 wt. % of lightweight aggregates,
c) 10-25 wt. % of a polymer;

and whereby the adhesive composition is chemically different from the mortar composition. In particular, all proportions given for the adhesive composition are with respect to the total weight of the adhesive composition in dry state.

"Chemically different" in particular means that the compositions differ at least in a chemical component, the percentage of a component, a chemical structure of a component and/or a particle size of a component.

Preferably, the kit of parts is provided as a two-component product. Thereby, preferably, a first component of the product is present in a first receptacle comprising the mortar composition and a second component of the product is present in a second receptacle comprising the adhesive composition.

However, it is also possible to provide a multi-component product with more than two components. In this case, for example, the mortar composition and/or the adhesive composition can be provided in two separate receptacles. Multi-component products allow e.g. for adjusting the adhesive composition and/or the mortar composition with regard to specific applications.

In the following, the adhesive composition is described in more detail. Thereby, if not otherwise stated, the general meaning of the terms "hydraulic binder", "lightweight aggregates", "alumina cement", "latent hydraulic and/or pozzolanic binder materials" and "rubber" is the same as described above in connection with the mortar composition.

Especially, the adhesive composition is a dry adhesive composition. This means that the adhesive composition is essentially free of water or an amount of water is below 1 wt. %, in particular below 0.5 wt. % or below 0.1 wt. %, with respect to the total weight of the adhesive composition.

According to a preferred embodiment, the adhesive composition is a one-component mixture. That means that all the individual materials and/or substances are intermixed. One-component compositions are in particular easy to handle and exclude the risk of a mix up or wrong dosing of individual components by users.

However, it is in principle possible to provide a two-component adhesive composition or even a multi-component adhesive composition. A first component may e.g. be present in a first receptacle comprising the hydraulic binder and the polymer. A second component, present in a second receptacle, may comprise the aggregates. Other distributions are possible as well. Two- or multi-component adhesive compositions allow e.g. for adjusting the adhesive composition with regard to specific applications.

A preferred amount of hydraulic binder of the adhesive composition is 21-50 wt. %, in particular 25-45 wt. %, especially 30-40 wt. %, with respect to the total weight of the adhesive composition in dry state.

Preferably, a weight ratio of the polymer to the hydraulic binder in the adhesive composition is from 0.1-5, in particular, 0.2-2.5, especially, 0.2-1, particularly 0.3-0.8 or 0.3-0.6.

Preferably, the hydraulic binder of the adhesive composition comprises or consists of cement. Preferably, the cement is Portland cement and/or alumina cement and/or sulphoaluminate cement.

Preferred Portland cement is according to norm EN 197, in particular of type CEM I. Preferably, the alumina cement is alumina cement according to standard EN 14647. Preferably, the sulphoaluminate cement is calcium sulphoaluminate cement.

A preferred amount of Portland cement in the adhesive composition is 10-40 wt. %, in particular 20-35 wt. %, especially 25-30 wt. %, with respect to the total weight of the adhesive composition in dry state.

In particular, the hydraulic binder of the adhesive composition comprises two different types of Portland cements, especially two types of Portland cements of different strength classes. Especially, a Portland cement of strength class 42.5 N is combined with a Portland cement of strength class 52.5 N. Strength classes are according to EN 197-1: 2011.

Preferably, in the adhesive composition a proportion of the cement with the lower strength class is higher than the proportion of the cement with the higher strength class. In particular, the proportion of the cement with the lower strength class is a factor of 1.5-5 higher than the proportion of the cement with the lower strength class.

Such a mix of different Portland cements turned out to be highly beneficial in terms of noise suppression, adhesion and strength development of the hardened adhesive composition.

Preferably, the adhesive composition comprises alumina cement and/or sulphoaluminate cement, preferably sulphoaluminate cement. In particular, a proportion of these cements in the adhesive composition is from 1-15 wt. %, in particular 3-10 wt. %, especially, 4-7 wt. %, with respect to the total weight of the adhesive composition in dry state.

According to a further preferred embodiment, the hydraulic binder of the adhesive composition comprises Portland cement and sulphoaluminate cement, in particular calcium sulphoaluminate cement.

Even more preferred, the hydraulic binder of the adhesive composition comprises two different types of Portland cements, especially two types of Portland cements of different strength classes, in combination with a sulphoaluminate cement, in particular calcium sulphoaluminate cement. The two types of Portland cements of different strength classes are in particular chosen as described above.

Sulphoaluminate cements, especially in combination with Portland cements, have been proven to be especially advantageous for the adhesive composition.

A weight ratio of Portland cement to sulphoaluminate cement in the adhesive composition is preferably from 2-10, especially 3-8, in particular 4-7 or 5-6.

According to a preferred embodiment, the adhesive composition comprises 10-40 wt. %, in particular 20-35 wt. %, especially 25-30 wt. %, Portland cement and 1-15 wt. %, in particular 3-10 wt. %, especially, 4-7 wt. %, sulphoaluminate cement, each with respect to the total weight of the adhesive composition in dry state, as hydraulic binder. In addition, in this case, preferably, two types of Portland cements of different strength classes are chosen, as described above.

Moreover, the hydraulic binder of the adhesive composition can optionally comprise or consist of latent hydraulic and/or pozzolanic binder materials. In particular, the latent hydraulic or pozzolanic binder material comprises or consists of slag, fly ash, silica fume, metakaolin and/or natural pozzolanes. Thereby, slag, in particular furnace slag is especially preferred.

Preferably, in the adhesive composition a proportion of the latent hydraulic and/or pozzolanic binder materials is from 0.5-20 wt. %, in particular 2-10 wt. %, especially 3-7 wt. %, with respect to the total weight of the adhesive composition in dry state.

According to a preferred embodiment, the hydraulic binder of the adhesive composition comprises in combination:
  10-40 wt. %, in particular 20-35 wt. %, especially 25-30 wt. %, Portland cement, with respect to the total weight of the adhesive composition in dry state; and
  1-15 wt. %, in particular 3-10 wt. %, especially, 4-7 wt. %, sulphoaluminate cement, with respect to the total weight of the adhesive composition in dry state. Also in this case, preferably, two types of Portland cements of different strength classes are chosen, as described above; and
  from 0.5-20 wt. %. in particular 2-10 wt. %, especially 4-8 wt. %, latent hydraulic and/or pozzolanic binder materials, especially slag and/or fly ash, with respect to the total weight of the adhesive composition in dry state.

With regard to the lightweight aggregates of the adhesive composition, a particle density of the lightweight aggregates is preferably from 100-2,000 kg/m$^3$, especially 400-1,900 kg/m$^3$, preferably 700-1,500 kg/m$^3$ or 800-1,300 kg/m$^3$.

Especially, a proportion of the lightweight aggregates of the adhesive composition is from 20-50 wt. %, in particular 25-55 wt. %, especially 35-45 wt. %, with respect to the total weight of the adhesive composition in dry state.

Preferred lightweight aggregates of the adhesive composition comprise or consist of wood particles, rubber particles, plastic particles and/or porous particles, especially porous inorganic particles. More preferred particles are rubber particles and/or porous particles. Most preferred particles are rubber particles.

Rubber particles can consist of natural and/or synthetic rubber. The rubber is chemically different from the above-mentioned polymer of the adhesive composition.

In particular, the rubber particles of the adhesive composition comprise or consist of natural polyisoprene; synthetic polyisoprene; polybutadiene; chloroprene rubber, such as e.g. polychloroprene, neoprene, baypren; butyl rubber, in particular copolymers of isobutylene and isoprene; halogenated butyl rubber, such as e.g. chloro butyl rubber, bromo butyl rubber; styrene-butadiene rubber, in particular copolymers of styrene and butadiene, nitrile rubber, in particular a copolymer of butadiene and acrylonitrile and/or hydrogenated nitrile rubber.

For example, the rubber particles are recycled rubber particles, in particular obtained from worn shoes and/or tires. For example, the rubber particles are derived from rubber products, e.g. end-of-life tires, through cryogenic milling.

In a further preferred embodiment, the lightweight aggregates of the adhesive composition comprise or consist of porous particles. In particular, the porous particles have a porosity of at least 25 vol. %, especially at least 50 vol. %, in particular at least 75 vol. %, with respect to the total volume of the porous particles.

Especially, the porous particles of the adhesive composition are chosen from expanded polystyrene granules, expanded silica, volcanic rock, e.g. pumice and/or perlite. Expanded silica is highly preferred.

However, the lightweight aggregates of the adhesive composition may also comprise or consist of cork and/or plastics, in particular recycled plastics. For example, the lightweight aggregates comprise or consist of polyethylene terephthalate (PET).

Preferably, a particle size of the lightweight aggregates of the adhesive composition is from 0.01-2 mm, especially 0.05-1.5 mm, preferably 0.1-1.0 mm, in particular 0.1-0.6 mm. This is in particular true independently of the type of lightweight aggregate used in the adhesive composition.

Also in this case, the particle size can e.g. be determined by laser diffraction as described in ISO 13320:2009. Preferably, a particle size of non-spherical or irregular particles is represented by the equivalent spherical diameter of a sphere of equivalent volume. Especially, the lower values of the ranges given for the particle size represent D1 values whereas the upper values of the ranges given for the particle size represent D99 values. Put differently, in this case, 1% of the particles have a lower particle size than the lower value of a range, whereas 1% of the particles have a larger particle size than the upper value of a range.

Especially, the adhesive composition comprises 30-60 wt. %, especially 35-55 wt. %, of rubber particles and 1-15 wt. %, especially 3-10 wt. %, of porous particles, preferably porous inorganic particles, as lightweight aggregates. Thereby expanded silica or glass is most preferred as inorganic particles.

According to a highly preferred embodiment, in the adhesive composition a proportion of aggregates with a particle density >2,000 kg/m³, especially >2,100 kg/m³ or >2,200 kg/m³, is <25 wt. %, especially <10 wt. %, preferably <5 wt. % or <1 wt. %. In particular, the adhesive composition does not comprise any aggregates with a particle density >2,000 kg/m³, especially >2,100 kg/m³ or >2,200 kg/m³.

Especially, in the adhesive composition a proportion of sand, quartz, calcium carbonate, natural river sand, gravel, basalt and/or metallic aggregates is <25 wt. %, especially <10 wt. %, preferably <5 wt. % or <1 wt. %. Especially, the adhesive composition does not comprise any of such aggregates.

Preferably, the polymer used in the adhesive composition is a water-soluble or water-redispersible polymer, in particular a redispersible polymer. Such polymers have proven to be beneficial in the present adhesive compositions. However, e.g. for specific purposes, other polymers might be suitable as well.

Preferably, the polymer of the adhesive composition is present in solid state, especially as a powder.

Especially, the polymer of the adhesive composition is used as a binder in order to control strength of the adhesive composition.

Preferably, the polymer of the adhesive composition has a glass transition temperature of −45-10° C., especially −35-5° C., preferably −25-0° C., in particular −20-0° C., particularly preferred −20-−10° C. Such polymers can further improve the strength and noise suppression properties of the adhesive composition. Most preferred are redispersible polymers with these glass transition temperatures.

Especially, the polymer of the adhesive composition is a homopolymer or copolymer based on one or more monomers selected from a vinyl ester, vinyl acetate, vinyl alcohol, vinyl chloride, vinyl laureate, acrylic acid, acrylate, methacrylic acid, methacrylate, methylmethacrylate, acrylonitrile, styrene, butadiene, ethylene or mixtures thereof.

Highly preferred polymers of the adhesive composition are copolymers based on vinyl esters, ethylene and acrylic acid esters.

Preferably, the polymer of the adhesive composition is selected from poly(vinyl acetate-ethylen), poly(vinyl acetate-ethylen-methylmethacrylate), poly(vinyl acetate-ethylen-vinylester), poly(vinyl acetate-ethylen-acrylic acid ester), poyl(vinyl acetate-ethylen-vinyl laureate), poly(vinyl acetate-vinyl versate), poly(acrylic ester-acrylonitrile), poly(acrylic ester-styrene butadiene) or mixtures thereof. Highly preferred as the polymer is a poly(vinyl ester-ethylene-acrylic acid ester).

However, other polymers might be suitable as well for the adhesive composition.

A preferred amount of the polymer in the adhesive composition is 10-20 wt. %, in particular 12-18 wt. %, especially 13-17 wt. %, with respect to the total weight of the adhesive composition.

Preferably, in the adhesive composition a weight ratio of the lightweight aggregates to the polymer is from 1-10, in particular 1.5-7, especially 2-5. This is in particular true if the lightweight aggregates comprise or consist of rubber and the polymer is a redispersibale polymer.

Furthermore, it can be beneficial if the adhesive composition comprises an additive selected from the group consisting of setting time regulators, plasticizers, defoamers, rheology modifiers, thixotropic agents, aerating and/or foaming agents, anti-shrinkage agents, corrosion inhibitors, fire-retarding agents, fibers, and chromium reducers.

Preferably, a proportion of the additives of the adhesive composition in total is from 0-5 wt. %, especially 1-5 wt. % with respect to the weight of the adhesive composition in dry state.

Preferably, the adhesive composition comprises a layered silicate, in particular a phyllosilicate, as an additive. Preferably, the layered silicate is a bentonite or an aluminum phyllosilicate. Especially, a layered silicate is used in combination with rubber particles as described above. As it turned out, layered silicates help to stabilize rubber particles in the adhesive composition.

A proportion of the layered silicate of the adhesive composition is preferably from 0.01-2 wt. %, in particular 0.1-1 wt. %, especially 0.2-0.7 wt. %, with respect to the weight of the adhesive composition in dry state.

Especially the adhesive composition comprises a thixotropic agent, in particular silica, silica fume, cellulose, and/or saccharides. A proportion of the thixotropic agent of the adhesive composition is preferably from 0.001-1 wt. %, in particular 0.1-0.5 wt. %, with respect to the weight of the adhesive composition in dry state.

According to another preferred embodiment, the adhesive composition comprises a plasticizer, whereby the plasticizer is in particular selected from the group of lignosulfonates, gluconates, naphtalenesulfonates, melamine sulfonates, vinyl copolymers and/or polycarboxylate ethers. Polycarboxylate ethers are preferred.

In particular, the plasticizer is chemically different from the above-mentioned polymer and rubber of the adhesive composition. A proportion of polycarboxylate ethers in the adhesive composition is preferably from 0.001-1 wt. %, in particular 0.1-0.5 wt. %, with respect to the weight of the adhesive composition in dry state.

Preferably, the adhesive composition comprises fibers, in particular glass, plastic and/or cellulose fibers. Glass fibers are highly preferred. A proportion of the fibers of the adhesive composition is preferably from 0.001-3 wt. %, in particular 0.01-2.0 wt. %, especially 0.1-1 wt. %, with respect to the weight of the adhesive composition in dry state. A preferred length of the fibers of the adhesive composition is from 0.5-12 mm, especially 2-5 mm. A diameter of the fibers of the adhesive composition is for example 0.5-1,000 μm, especially 1-100 μm, in particular 5-40 μm.

A preferred adhesive composition comprises or consists of:
  25-45 wt. % of hydraulic binder, especially comprising Portland cement, and sulphoaluminate cement and optionally fly ash;
  35-55 wt. % of rubber aggregates, especially with a particle size of 0.1-1.0 mm, preferably 0.1-0.6 mm;
  10-25 wt. % of a water redispersible polymer, especially with a glass transition temperature of −20-0° C.;
  0-5 wt. %, especially 1-5 wt. %, of one or more additives; and
  wherein, preferably, a proportion of aggregates with a particle density >2,000 kg/m³ is <5 wt. % or <1 wt. %, whereby the proportions are with respect to the weight of the adhesive composition in dry state.

A highly preferred adhesive composition comprises or consists of:
  20-30 wt. % of Portland cement, especially of two different types of Portland cement;
  3-10 wt. % of calcium sulphoaluminate cement;
  optionally 4-8 wt. % latent hydraulic and/or pozzolanic binder materials, especially slag and/or fly ash;

35-55 wt. % of rubber aggregates, especially with a particle size of 0.1-1.0 mm, preferably 0.1-0.6 mm;

3-10 wt. % of porous inorganic particles, especially with a particle size of 0.1-0.6 mm;

10-25 wt. % of a water redispersible polymer, especially with a glass transition temperature of −20-0° C.;

0-5 wt. %, especially 1-5 wt. %, of one or more additives; and wherein, preferably, a proportion of aggregates with a particle density >2,000 kg/m$^3$ is <5 wt. % or <1 wt. %, whereby the proportions are with respect to the weight of the adhesive composition in dry state.

In the kit-of parts, preferably, a proportion of lightweight aggregates, especially rubber particles, in the mortar composition is higher than a proportion of the lightweight aggregates, especially rubber particles, in the adhesive composition. Especially, the proportion of lightweight aggregates, especially rubber particles, in the mortar composition is 1.1-5 times, especially 1.5-3 times, higher than the proportion of the lightweight aggregates, especially rubber particles, in the adhesive composition.

In particular, in the kit-of parts, a proportion the hydraulic binder in the adhesive composition is higher than a proportion of the hydraulic binder in the mortar composition.

Especially, in the kit of parts, a proportion of Portland cement in the adhesive composition is higher than proportion of Portland cement in the mortar composition.

Preferably, in the kit-of parts, the polymer of the adhesive composition is chemically different form the polymer of the mortar composition. Preferably, a glass transition temperature of the polymer of the adhesive composition is different form the glass transition temperature of the polymer of the mortar composition.

Preferably, in the kit-of parts, the rubber particles of the mortar composition have a different shape than the rubber particles of the adhesive composition. For example, the rubber particles of the mortar composition are non-spherical or irregular shaped, especially prismatic shaped, whereas the rubber particles of the adhesive composition have a round shape.

A preferred kit-of-parts composition comprises or consists of:
(i) a mortar composition comprising:
30-80 wt. %, especially 50-75 wt. %, of rubber particles comprising two different types of rubber particles with two different particles sizes wherein, in particular, a weight ratio of the first type of particles having a smaller particle size to the second type of particles having a larger particle is from 2:1-4:1 or 2.5:1-3.5:1;
whereby the proportions are with respect to the weight of the mortar composition in dry state; and
(ii) an adhesive composition comprising or consisting of:
hydraulic binder comprising Portland cement and sulphoaluminate cement and optionally fly ash;
35-55 wt. % of rubber aggregates, especially with a particle size of 0.1-1.0 mm, preferably 0.1-0.6 mm;
wherein, preferably, a proportion of aggregates with a particle density >2,000 kg/m$^3$ is <5 wt. % or <1 wt. %, whereby the proportions are with respect to the weight of the adhesive composition in dry state.

A more preferred kit-of-parts composition comprises or consists of:
(i) a mortar composition comprising or consisting of:
3-18 wt. % of calcium aluminate cement and/or sulphoaluminate cement;
optionally 4-8 wt. % latent hydraulic and/or pozzolanic binder materials, especially slag and/or fly ash;
30-80 wt. %, especially 50-75 wt. %, of rubber particles, especially comprising two different types of rubber particles with two different particles sizes wherein, in particular, a weight ratio of the first type of particles having a smaller particle size to the second type of particles having a larger particle is from 2:1-4:1 or 2.5:1-3.5:1;
1-15 wt. %, of porous particles, especially with a particle size of the porous particles is 0.1-0.6 mm, whereby, preferably, the porous particles comprise or consist of expanded glass 1-15 wt. % of porous inorganic particles, especially with a particle size of 0.1-0.6 mm;
5-20 wt. %, especially 7-15 wt. %, of a water soluble or water redispersible polymer, especially a copolymer based vinyl acetate and ethylene;
0-10, especially 1-5 wt. %, of one or more additives, especially comprising layered silicates;
whereby the proportions are with respect to the weight of the mortar composition in dry state; and
(ii) An adhesive composition comprising or consisting of:
25-45 wt. % of hydraulic binder, especially comprising Portland cement, and sulphoaluminate cement and optionally fly ash;
35-55 wt. % of rubber aggregates, especially with a particle size of 0.1-1.0 mm, preferably 0.1-0.6 mm;
10-25 wt. % of a water redispersible polymer, especially with a glass transition temperature of −20-0° C.;
0-5, especially 1-5 wt. %, of one or more additives; and
wherein, preferably, a proportion of aggregates with a particle density >2,000 kg/m$^3$ is <5 wt. % or <1 wt. %.
whereby the proportions are with respect to the weight of the adhesive composition in dry state.

Most preferred, the kit-of-parts comprises or consists of:
(i) a mortar composition comprising or consisting of:
4-15 wt. % of calcium aluminate cement;
optionally 4-8 wt. % latent hydraulic and/or pozzolanic binder materials, especially slag and/or fly ash;
50-75 wt. %, of rubber particles, comprising two different types of rubber particles with two different particles sizes wherein a weight ratio of the first type of particles having a smaller particle size to the second type of particles having a larger particle is from 2:1-4:1 or 2.5:1-3.5:1;
2-20 wt. % of porous inorganic particles with a particle size of 0.1-0.6 mm, whereby, preferably, the porous particles comprise or consist of expanded glass;
7-15 wt. %, of a water soluble or water redispersible polymer, especially a copolymer based vinyl acetate and ethylene;
1-10 wt. %, of one or more additives, especially comprising layered silicates;
wherein, preferably, a proportion of aggregates with a particle density >2,000 kg/m$^3$ is <5 wt. % or <1 wt. %;
whereby the proportions are with respect to the weight of the mortar composition in dry state; and
(ii) an adhesive composition comprising or consisting of:
20-30 wt. % of Portland cement, especially of two different types of Portland cement;
3-10 wt. % of calcium sulphoaluminate cement;
optionally 4-8 wt. % latent hydraulic and/or pozzolanic binder materials, especially slag and/or fly ash;
35-55 wt. % of rubber aggregates, especially with a particle size of 0.1-1.0 mm, preferably 0.1-0.6 mm;
3-10 wt. % of porous inorganic particles, especially with a particle size of 0.1-0.6 mm;
10-25 wt. % of a water redispersible polymer, especially with a glass transition temperature of −20-0° C.;

0-5, especially 1-5 wt. %, of one or more additives; and
wherein, preferably, a proportion of aggregates with a
particle density >2,000 kg/m³ is <5 wt. % or <1 wt. %;
whereby the proportions are with respect to the weight of
the adhesive composition in dry state.

A further aspect of the present invention relates to a
structure, in particular a floor, a wall or a ceiling, comprising:
- a substrate, in particular a floor, especially made of concrete;
- a first layer, comprising or consisting of a mortar composition as described above, in particular in hardened state;
- a second layer, especially consisting or comprising of an adhesive composition as defined above, in particular in hardened state;
- a cover element, in particular a tile, whereby the cover element is fixed to the first layer with the adhesive composition of the second layer.

In particular, for producing the structure, an adhesive composition as defined above or a kit-of-parts as described above can be used. However, it is in principle possible to use a different adhesive composition.

Especially, a thickness of the first layer is larger than a thickness of the second layer. Thereby, preferably, a ratio of the thickness of the first layer to the thickness of the second layer is from 1.1-10, in particular 1.2-5, especially 1.3-3.

In particular, a thickness of the first layer is from 4-10 mm, especially 5.0-9 mm and a thickness of the second layer is from 3-5 mm, especially 3.5-4.5 mm.

Optionally, it is possible to have an additional primer layer and/or intermediate layer between the substrate and the first layer, between the first and the second layer and/or between the second layer and the cover element. This might further increase the adhesion between the substrate, the layers and/or the cover element and/or help to achieve even better noise or vibration suppression.

According to a preferred embodiment, the structure comprises an intermediate layer, especially a screed, between the first and the second layer. For example, a thickness of the intermediate layer is from 1-80 mm, especially 3-15 mm. Such an intermediate layer can help to stabilize the overall structure by reducing cracks in the cover element. Moreover, it was found that due to the increased mass, the overall sound dampening of the structure can be improved.

Preferably, the intermediate layer is a cementitious screed, in particular a cementitious screed according to DIN EN 13 813:2017. Especially, the screed comprises cement and sand, whereby a ratio of cement to sand is from 1:1 to 1:5. Preferably, a maximum grain size of the sand is 16 mm, more preferably 8 mm. In particular, the cement is a Portland cement, especially according to type CEM I. Thus, a highly preferred structure, in particular a floor, a wall or a ceiling, comprises:
- a substrate, in particular a floor, especially made of concrete;
- a first layer, comprising or consisting of a mortar composition as described above, in particular in hardened state;
- an intermediate layer, especially a screed as described above, in particular in hardened state;
- a second layer, especially consisting or comprising of an adhesive composition as defined above, in particular in hardened state;
- a cover element, in particular a tile, whereby the cover element is fixed to the first layer with the adhesive composition of the second layer.

However, in another preferred embodiment, the second layer is directly applied onto the first layer.

In particular, the substrate is a floor, a wall or a ceiling made essentially of mortar, concrete, bricks, plaster, metal, plastics and/or wood. Preferably, the cover element is a tile in the form of a ceramic tile, a stone and/or a veneer.

With such kind of structures, significant noise reductions can be achieved.

Another aspect of the present invention relates to a method for the production of a structure, especially with a kit-of-parts as described above, whereby:
- a mortar composition as described above is mixed with water and applied on a substrate as a first layer;
- then an adhesive composition as described above is mixed with water and applied on the first layer as a second layer;
- subsequently, a cover element, especially a tile, is placed on the second layer.

Preferably, the mortar composition of the first layer is applied with a thickness from 4-10 mm, especially 5.0-9 mm, and the adhesive composition is applied with a thickness from 3-5 mm, especially 3.5-4.5 mm.

Another aspect of the present invention relates to a method for the production of a structure, especially with a kit-of-parts as described above, whereby:
- a mortar composition as described above is mixed with water and applied on a substrate as a first layer;
- then an intermediate layer, especially a screed as described above, is applied on the first layer;
- then an adhesive composition as described above is mixed with water and applied on the intermediate layer as a second layer;
- subsequently, a cover element, especially a tile, is placed on the second layer In this case, preferably, the mortar composition of the first layer is applied with a thickness from 4-10 mm, especially 5.0-9 mm, the intermediate layer is applied with a thickness of 1-80 mm, especially 3-15 mm, and the adhesive composition is applied with a thickness from 3-5 mm, especially 3.5-4.5 mm. An additional aspect of the present invention relates to the use of a mortar composition as described, optionally in combination with an adhesive composition as described above, or of a kit-of-parts as described above, for fixing tiles on a substrate, in particular on a floor, a wall or a ceiling of a building or a facility.

According to another preferred embodiment, the mortar composition as described herein, optionally in combination with an adhesive composition as defined above, or a kit-of-parts as described above, is used for acoustic damping, noise reduction and/or vibration reduction in particular on floors, walls or ceilings of buildings and/or facilities.

Further advantageous configurations of the invention are evident from the exemplary embodiments.

EXEMPLARY EMBODIMENTS

1. Mortar Compositions

Table 1 shows six mortar compositions M1-M6. The mortar compositions have been prepared by intermixing all of the components in dry state. The mortar composition M1-M6 are present as dry powders.

TABLE 1

| Component | M1 | M2 | M3 | M4 | M5 | M6 |
|---|---|---|---|---|---|---|
| Hydraulic binder [wt. %] | | | | | | |
| Portland cement (CEM I, 42.5N) | — | — | — | 8 | 4 | 8 |
| Calcium aluminate cement[1] | — | — | — | 8 | 4 | 8 |
| Calcium sulphoaluminate cement[2] | 9 | 5 | 5 | — | — | — |
| Fly ash | — | — | — | 10 | 2 | — |
| Slag | — | — | — | — | — | — |
| Lightweight aggregates [wt. %] | | | | | | |
| Rubber[3] | 56 | 50 | 34 | 31 | 33 | — |
| Rubber[4] | 17 | 27 | 43 | 31 | 40 | 71 |
| Expanded glass[5] | 3 | 3 | 3 | — | — | — |
| Further aggregates [wt. %] | | | | | | |
| Sand | — | — | — | — | 6 | — |
| Polymer [wt. %] | | | | | | |
| Redispersible copolymer[6] | 12.5 | 12.2 | 12.4 | — | — | — |
| Redispersible copolymer[7] | — | — | — | 10.8 | 10.0 | 10.8 |
| Additives [wt. %] | | | | | | |
| Plasticizer[8] | 0.05 | 0.05 | 0.05 | — | 0.04 | — |
| Layered silicate[9] | 0.8 | 1.0 | 1.0 | — | — | — |
| Processing additives[10] | 1.65 | 1.75 | 1.55 | 1.2 | 0.06 | 2.2 |

[1]Isidac 40, calcium aluminate cement, Cimsa, Turkey
[2]Alicem, available from Heidelberg Cement, Germany
[3]Prismatic rubber particles, particle size 0-0.4 mm
[4]Prismatic rubber particles, particle size 0.6-1.5 mm
[5]Poraver, particle size 0.3-0.5 mm, Dennert Poraver GmbH, Germany
[6]Soft, flexible vinylacetate-ethylene copolymer (Tg appr. −14° C.)
[7]Highly flexible vinylacetate-ethylene-vinylester terpolymer (Tg appr. −14° C.)
[8]Sika Viscocrete 225, polycarboxylate ether, Sika Germany
[9]Bentonil CV15V, bentonites, Clariant, Gemany
[10]Defoamer, rheology modifiers, thixotropic agents Mortar compositions M1-M6 have been mixed with water (weight ratio of water to total weight of dry mortar composition=0.34-0.64) in order to obtain processable compositions.

Flow table spread values were assessed according to standard EN 12350-5:2009. Directly after preparation values in the range of 250-290 mm were obtained. Thus, the mortar compositions show a flow behavior which makes processing easy.

Internal tests similar to ISO 10140-3:2010 and ISO 717-2 showed that with uncovered mortar compositions, impact noise reductions ΔLw about up to 20 dB could be achieved.

2. Adhesive Compositions

Table 2 shows six adhesive compositions C1-C7. The adhesive compositions have been prepared by intermixing all of the components in dry state. The adhesive composition C1-C7 are present as dry powders.

TABLE 2

| Component | C1 | C2 | C3 | C4 | C5 | C6 | C7 |
|---|---|---|---|---|---|---|---|
| Hydraulic binder [wt. %] | | | | | | | |
| Portland cement (CEM I, 42.5N) | 20 | 25 | 25 | 30 | 20 | 20 | 35 |
| Portland cement (CEM I, 52.5N) | 10 | — | — | — | 5 | — | — |
| Calcium sulphoaluminate cement[1] | 5 | 5 | 5 | — | 5 | 10 | — |
| Fly ash | 4 | 5 | 5 | 5 | 4 | 5 | 5 |
| Flag | 2 | — | — | — | 2 | — | — |
| Lightweight aggregates [wt. %] | | | | | | | |
| Rubber[2] | 36 | — | 41 | 41 | 41 | — | — |
| Rubber[3] | — | 41 | — | — | — | 41 | 41 |
| Expanded glass[4] | 5 | 5 | 5 | 5 | 5 | 5 | 5 |
| Polymer [wt. %] | | | | | | | |
| Redispersible copolymer[5] | 15 | 16 | 16 | 16 | 15 | 17 | 12 |
| Additives [wt. %] | | | | | | | |
| Plasticizer[6] | 0.1 | 0.1 | 0.1 | 0.1 | 0.1 | 0.1 | 0.1 |
| Fibers[7] | 0.5 | — | 0.5 | 0.5 | 0.5 | — | — |
| Accelerator[8] | 1.2 | 1.2 | 1.2 | 1.2 | 1.2 | 1.2 | 1.2 |
| Layered silicate | 0.5[#] | 0.3[9] | 0.3[9] | 0.3[9] | 0.5[#] | 0.3[9] | 0.3[9] |
| Processing additives[10] | 0.7 | 1.4 | 0.9 | 0.9 | 0.7 | 0.4 | 0.4 |

[1]Alicem, available from Heidelberg Cement, Germany
[2]Genan 40 Mesh, particle size: 180-425 μm, Genan GmbH, Germany
[3]Prismatic rubber particles, particle size 0.1-0.4 mm
[4]Poraver, particle size 0.1-0.3 mm, Dennert Poraver GmbH, Germany
[5]Semi-flexible vinylacetate-ethylene-acrylicacid ester terpolymer
[6]Sika Viscocrete 125 P, polycarboxylate ether, Sika Germany
[7]Cem-Fil, type 70/30, glass fibers, 3 mm length, 20 μm diameter, Owens Corning Composite Materials LLC, USA
[8]Calcium formate and Aluminium sulphate
[9]Optibent 602, phyllosilicate, Byk-Chemie GmbH, Germany
[#]1:1 mixture of Optibent 602 and Optibent Nib, phyllosilicates, Byk-Chemie GmbH, Germany
[10]Defoamer, rheology modifiers, thixotropic agents Adhesive compositions C1-C7 have been mixed with water (weight ratio of water to total weight of dry mortar composition=0.32-0.37) in order to obtain processable compositions.

Tests with the adhesive composition in line with EN 12004-1/2:2017 revealed that properties according to criteria C1E S2 and C2E S2 are achievable.

Internal tests similar to ISO 10140-3:2010 and ISO 717-2 showed that with covering tiles, impact noise reductions ΔLw of about up to 10 dB can be achieved with the adhesive compositions (without combination with a mortar composition).

3. Floor Structure with Tiles

A first floor structure was prepared as follows: A substrate in the form of a concrete slab (according to EN 10140-3) was covered with a first layer of mortar composition M1 (as described above in table 1) with a thickness of 10 mm. Subsequently, the first layer was covered with a second layer of adhesive composition C3 (as described above in table 2) with a thickness of 4 mm. On top of the second layer, ceramic tiles with a size of 30 cm×60 cm were placed.

For reasons of comparison, a second floor structure was prepared similar to the first floor structure. However, instead of the first layer of mortar composition M1, a conventional bituminous composition was used as the first layer.

Tests according to ISO 10140-3:2010 and ISO 717-2 showed impact noise reductions ΔLw of 15 dB for the first floor structure whereas impact noise reductions of the second structure was ΔLw=6 dB.

When comparing the noise reduction data of the adhesives and the floor structures, it is evident that the inventive mortar compositions functionally interact with the adhesive compositions such that high levels of noise reductions can be achieved (it is to be noted that sound levels expressed in decibels are logarithmic and therefore cannot be used for calculation without first being converted back to a linear scale).

Thus, it will be appreciated by those skilled in the art that the present invention can be embodied in other specific forms without departing from the spirit or essential characteristics thereof. The presently disclosed embodiments are therefore considered in all respects to be illustrative and not restricted.

The invention claimed is:

1. A mortar composition, comprising:
    a) 3-45 wt. % of a hydraulic binder,
    b) 15-80 wt. % of lightweight aggregates comprising at least two different types of particles, the at least two different types of particles including a first type of particles having a particle size in a range of 0.01 mm to 0.5 mm, and a second type of particles having a particle size in a range of 0.6 mm to 2 mm, both the first type of particles and the second type of particles being rubber particles, and
    c) 5-50 wt. % of a polymer.

2. The mortar composition according to claim 1, wherein the hydraulic binder comprises:
    3-18 wt. % of aluminate cement and/or sulphoaluminate cement;
    wherein all amounts are with respect to a total weight of the mortar composition in dry state.

3. The mortar composition according to claim 1, wherein the hydraulic binder comprises aluminate cement and/or sulphoaluminate cement and latent hydraulic and/or pozzolanic binder materials with a weight ratio of aluminate cement and/or sulphoaluminate cement to the latent hydraulic and/or pozzolanic binder materials in a range from 0.5-3.

4. The mortar composition according to claim 1, wherein a particle density of the lightweight aggregates is in a range from 100-2,000 kg/m$^3$.

5. The mortar composition according to claim 1, wherein a weight ratio of the first type of particles having a smaller particle size to the second type of particles having a larger particle size is in a range from 1:2-8:1.

6. The mortar composition according to claim 1, wherein the lightweight aggregates or particles have a non-spherical or irregular shape.

7. The mortar composition according to claim 1, wherein the polymer is a water soluble or water redispersible polymer, and/or wherein the polymer has a glass transition temperature in a range of −45-10° C.

8. The mortar composition according to claim 1, comprising:
    3-18 wt. % of calcium aluminate cement and/or sulphoaluminate cement;
    30-80 wt. % of rubber particles, wherein a weight ratio of the first type of particles having a smaller particle size to the second type of particles having a larger particle size is in a range from 2:1-4:1;
    1-15 wt. % of porous inorganic particles, with a particle size in a range of 0.1-0.6 mm;
    5-20 wt. % of a water soluble or water redispersible polymer; and
    0-10 wt. % of one or more additives;
    wherein all amounts are with respect to a total weight of the mortar composition in dry state.

9. A kit-of-parts comprising (i) the mortar composition according to claim 1, and (ii) an adhesive composition, wherein the adhesive composition comprises:
    a) 10-50 wt. % of a hydraulic binder,
    b) 20-60 wt. % of lightweight aggregates, and
    c) 10-25 wt. % of a polymer; and
    wherein the mortar composition is chemically different from the adhesive composition.

10. A structure comprising:
    a substrate;
    a first layer of the mortar composition according to claim 1,
    a second layer, comprising a adhesive composition comprising:
        a) 10-50 wt. % of a hydraulic binder,
        b) 20-60 wt. % of lightweight aggregates, and
        c) 10-25 wt. % of a polymer; and
    a cover element that is fixed to the first layer with the adhesive composition of the second layer.

11. The structure according to claim 10, wherein a thickness of the first layer is larger than a thickness of the second layer, and a ratio of the thickness of the first layer to the thickness of the second layer is in a range from 1.1-10.

12. A method of using the mortar composition according to claim 1, comprising:
    fixing tiles on a substrate with the mortar composition.

13. A method of using the mortar composition according to claim 1, comprising:
    performing acoustic damping, noise reduction and/or vibration reduction on a substrate with the mortar composition.

* * * * *